United States Patent Office 3,351,946
Patented Nov. 7, 1967

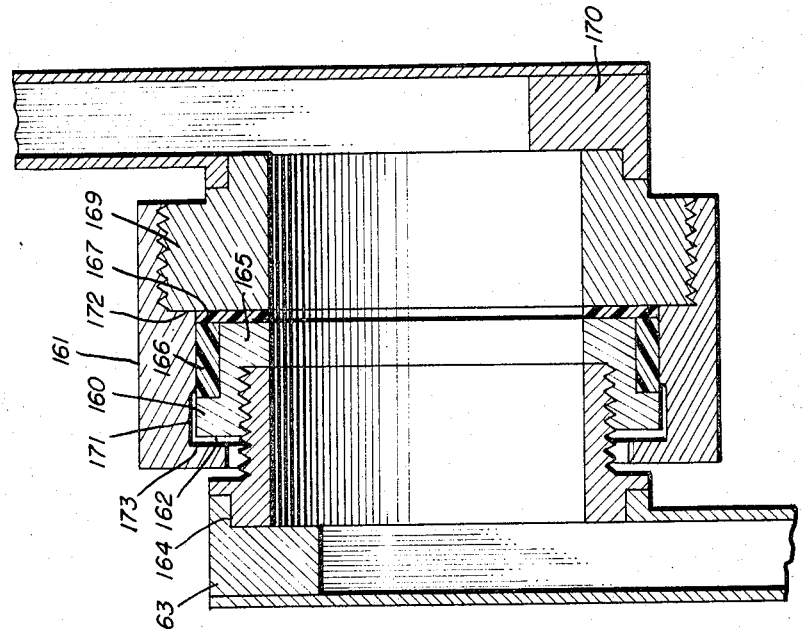
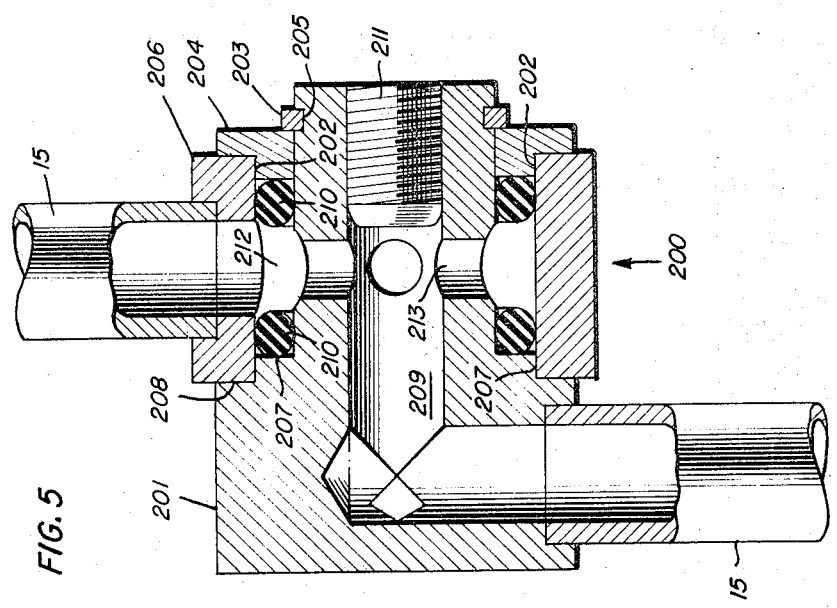

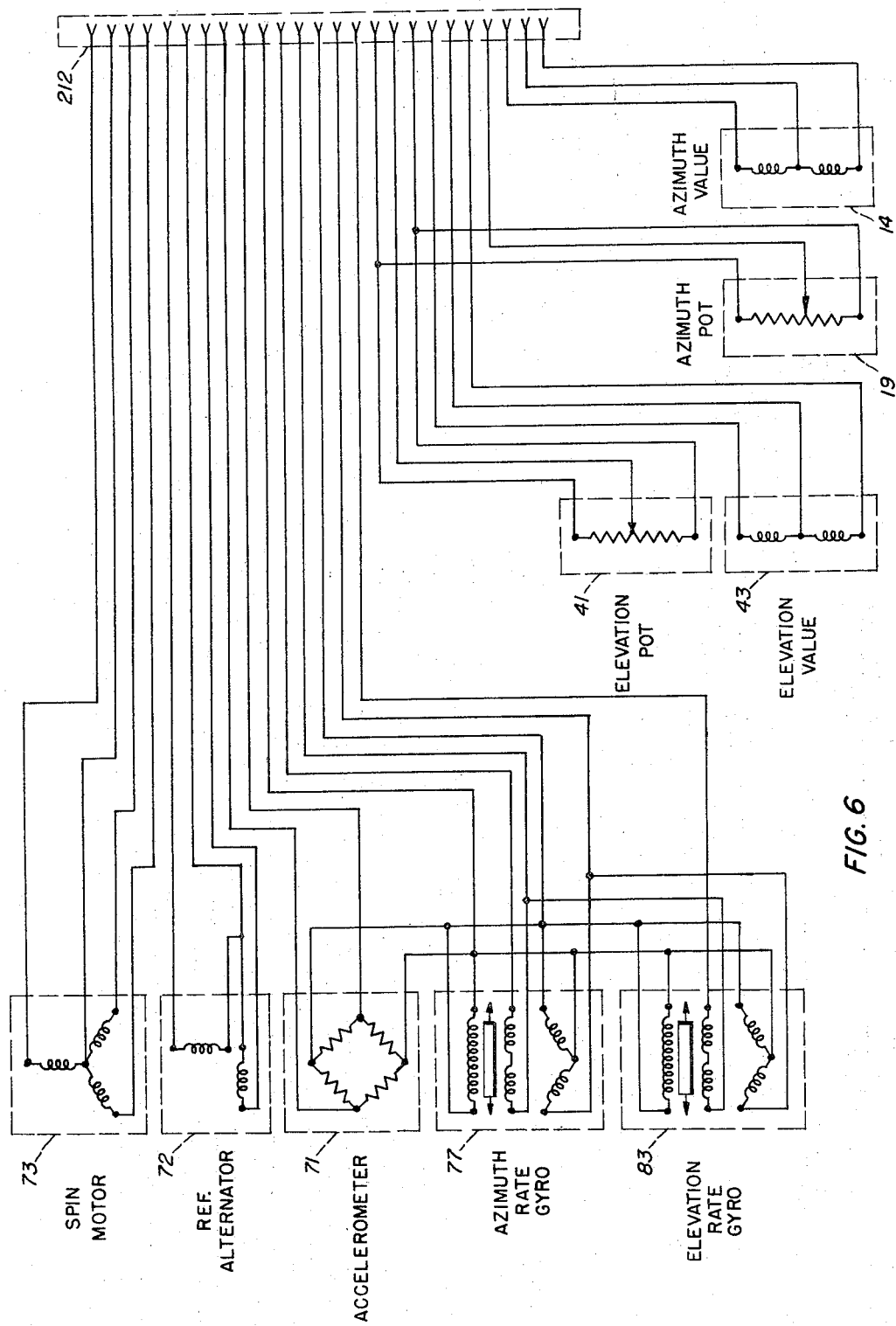

3,351,946
MISSILE MOUNTED HYDRAULICALLY
DRIVEN SCANNING ANTENNA
Kenneth W. Verge, Farmington, Mich., assignor, by mesne assignments, to the United States of America as represented by the Secretary of the Navy
Filed Sept. 3, 1963, Ser. No. 306,390
15 Claims. (Cl. 343—705)

This invention relates to scanning devices for receiving or directing radiant energy in a desired pattern and more particularly to an antenna system which has a wide look angle and is suitable for use with missile guidance systems.

In many types of scanning devices such as those used in missile guidance systems, it is necessary for the antenna system to be of the "wide angle" or "large angle" type. This type of antenna is usually employed on fast-moving guided missiles, for example, a pilotless rocket that is carrying a warhead and has a guidance system for automatically tracking a stationary or moving target such as an enemy airplane or missile. Large "look" or large angle antennas are necessary in systems of this type in order that targets which appear off the longitudinal axis of the guided missile may be "seen" and tracked by the missile guidance system. Usually the missile antenna systems are of the non-tracking type. The use of tracking antennas in missiles has an advantage over the non-tracking type of antenna in that it allows increased missile performance and eases the maneuverability requirements of the missile for a given target flight path.

Prior guided missile antenna systems of the non-tracking type are not suitable for present day high-speed modern guided missiles. Further, these antennas do not have the look angle capabilities necessary for obtaining high missile performance.

In the present invention, the antenna is a tracking type and is basically a two-axis servo, whose function is to provide a space stabilized reference for a missile radar system. The antenna gimballing is stabilized along its two axes by appropriate stabilizing means such as a gyro or the like in order to provide a mechanical decoupling of the antenna from the missile body motions. The azimuth gimbal assembly of the antenna has freedom of movement about the azimuth axis of the missile and referenced to this gimbal assembly is an elevation or inner gimbal member with freedom of motion about the vertical axis of the missile. Mounted by appropriate means on the inner gimbal member is the radar feed and its associated parabolic radiant energy reflector. The motion of each gimbal within its respective plane has a wide angle displacement thereof about the position in which the radar line of sight is colinear with the missile longitudinal axis. Driving means of an appropriate type is provided for each of the gimbal members for moving the gimbal assembly with respect to the missile body.

An object of the present invention is to provide an antenna mechanism combination that has a large "look" angle for improved missile tracking operation performance.

Another object is to provide an antenna tracking mechanism which is of relatively simple construction and of lighter weight than existing antennas.

Another object is to provide an antenna mechanism for a missle tracking antenna which will be simple in construction and positive in operation.

A further object of the present invention is the provision of an antenna apparatus for providing a universal missile tracking antenna apparatus that may be adapted to various missiles without the need of major modification of the missile or antenna.

Another object is the provision of an antenna apparatus which has a gimballing system which will withstand shocks and/or operate under extremes of environmental conditions.

Another object is the provision of an antenna with a two-axis gimballing system for simplifying antenna slaving apparatus and characterized by simplified antenna geometry.

A further object is to provide a hydraulic tracking antenna system incorporating high pressure quick disconnect hydraulic couplings.

In correlation with the immediately preceding object another object of the invention is the provision of a hydraulically operated tracking missile antenna with quick disconnect hydraulic line coupling units that permit minimum of air entrapment upon assembly and disassembly of the units.

Still another object of the present invention is the provision of a tracking antenna with an improved microwave rotary coupling.

Another object of the invention is the provision for providing a tracking antenna apparatus with a microwave rotary coupling that has a positively controlled gap between the rotating members.

A still further object is the provision of tracking antenna apparatus for air-to-air missiles constructed as a unitary apparatus that is light in weight, has simple antenna geometry and that is characterized by a large antenna look angle for improved antenna performance.

Other objects, advantages and novel features of the invention will become apparent from the following detailed description of the invention when considered in conjunction with the accompanying drawings wherein:

FIG. 3 is an enlarged section of the outer gimballing suspension system and the outer gimballing ball suspension system;

FIG. 5 is a detailed section of the hydraulic rotary joint used in the tracking antenna system;

FIG. 6 is a schematic diagram of the antenna wiring system;

FIG. 7 is a detailed section of the rotary microwave joint used in the tracking antenna system.

Figure 1:
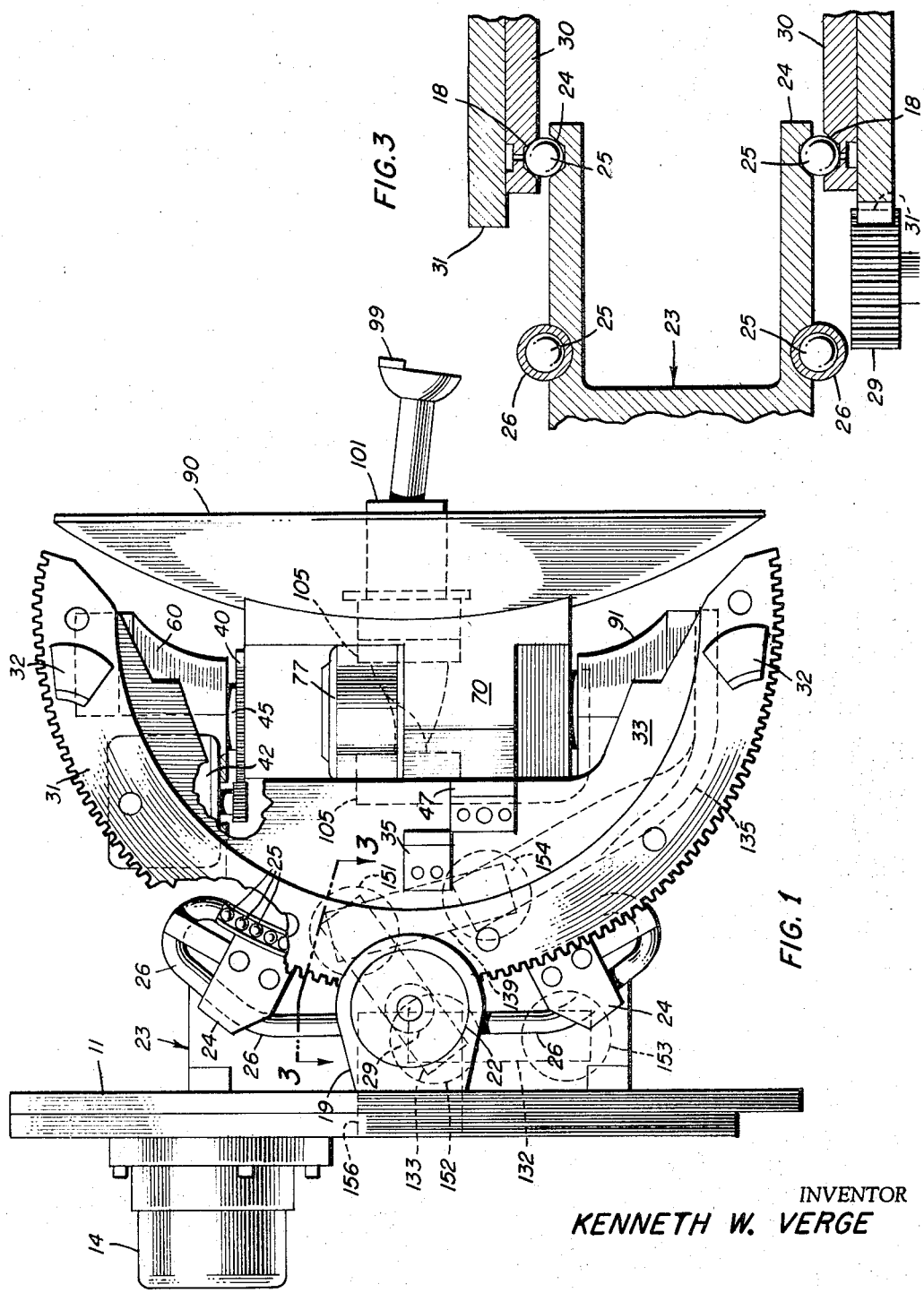
FIG. 1 shows an assembled view of a tracking antenna system utilizing the present invention.
Figure 2:
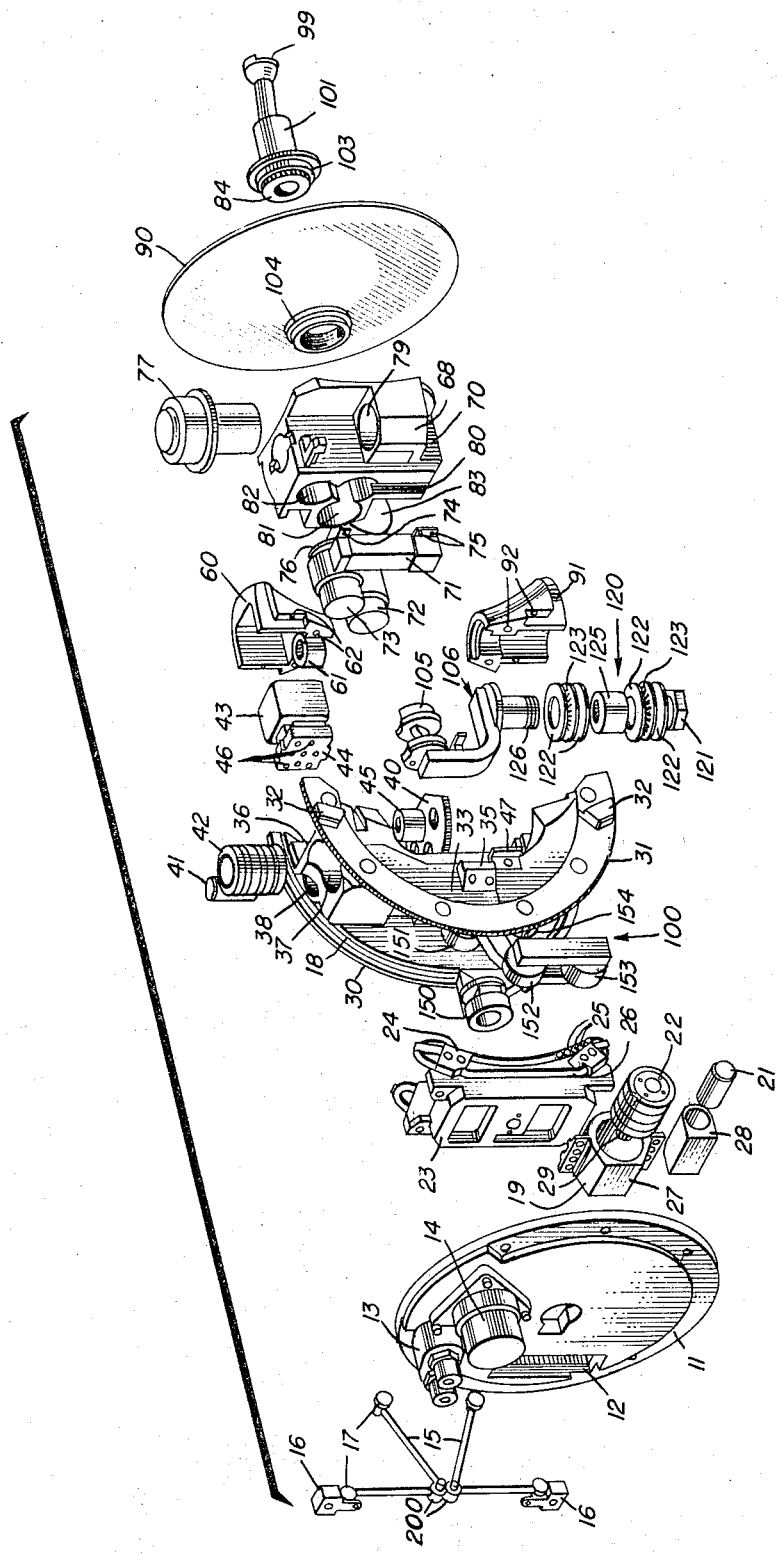
FIG. 2 shows an exploded view of the antenna system with the gimballing system and a number of operating parts broken away from various primary parts.

Referring now to FIG. 2 of the drawings, there is illustrated an exploded view of preferred embodiment of the missile antenna apparatus. The complete scanning unit for the missile radar is mounted on a circular base 11 which is adapted at its outer periphery for fastening to a missile body. A gasketing material, not shown, is usually inserted between the base 11 and the missile air frame structure, not shown, to prevent any extraneous material such as hydraulic fluid or the like from entering the inner body of the missile. The base 11 may be fabricated from aluminum alloy or any other suitable material. Mounted on the underside of the base 11 with appropriate fasteners are the outer gimbal servo valve 14, hydraulic connection assembly 13 and electrical terminal strip 12.

On the upper side of base 11 are mounted the hydraulic coupling plates 16 coupled to their respective linkages 15, hydraulic rotary joints 200, and end rotary joints 17. The hydraulic coupling plates 16 are fastened to the upper face plate of the base 11 with appropriate sealing means, known to those skilled in the hydraulic arts, to prevent hydraulic fluid leakage.

A motor housing 27 is secured to the upper side of base 11 by appropriate fastening means. The motor housing 27 has two shaped step surfaces 19 so as to mate with azimuth gimbal stops 32, to thereby restrict angular movement about a given azimuth angle. Fitted into the housing 27 is outer gimbal hydraulic motor 22 having on its one end a driving gear 29. A potentiometer housing 28, also secured to the base 11 houses the outer gimbal potentiometer 21. The outer gimbal potentiometer 21 has a gearing means, not shown, at one end that meshes with the driving gear 29 in order to follow the rotation of outer gimbal 30 as it moves about the azimuth axes.

The saddle 23 which forms the main supporting member for the rest of the antenna elements is fastened to the center of base 11. Saddle 23 has fastened to its sides by appropriate means recirculating ball-bearing tubes 26 and ball-bearing suspension tubes 24. The ball-bearing suspension tubes are shaped to conform to the curve of the azimuth toroidal sectors 30 and 33, respectively, and are constructed so as to permit free ball-bearing movement through the recirculating tubes 26, yet contain the ball-bearings within ball-bearing suspension tubes 24. The outer gimbal ball suspension tubes 24 support ball-bearings 25. The ball-bearings 25 are fitted into ball-bearing suspension tubes 24 which have integral ball-bearing races 18 on the inner sides of the toroidal sectors 30 and 33, respectively. These ball-bearing races are made of a high grade steel and are integrally fastened to the toroidal sectors 30 and 33, respectively. The race curvature of the ball-bearing races 24 and 18, respectively, are formed as a gothic arc (two intersecting arcs with centers offset) to provide maximum structural rigidity for the gimbal system. The ball-bearings 25 support the azimuth gimbal system with a suspension system which has maximum stiffness and strength and low friction, thus allowing freedom of movement about the azimuth axis over a large angular range.

The toroidal sectors 30 and 33, respectively, hereafter referred to as the outer gimbal system, are supported in spaced relationship to one another by the outer gimbal structure 36 positioned between them. On toroidal sector 33 is a ring gear or outer gimbal sector gear 31. This gear 31 meshes with driving gear 29 and is driven by hydraulic gimbal motor 22 for providing driving power for driving the gimbal through a desired angle about the azimuth axis. Also positioned on the outer surface of each of the toroidal sectors 30, 33 and at their extreme ends are stop members 32 which provide a braking means for stopping rotation of the outer gimbal system as it rotates about the azimuth axis. Stops 32 which mate with surfaces 19 on motor housing 27 prevent over-running of the outer gimbal system. A machined surface is provided in outer gimbal structure 36 to form a partial housing 37 for the inner gimbal motor 42. Motor 42 has a drive gear, not shown, at one end for meshing with and driving the inner gimbal sector or elevation gear 40. Outer gimbal structure 36 also has another machined surface therein for providing a housing 38 for the inner gimbal potentiometer 41; the potentiometer 41 being geared by appropriate means in order to move in conjunction with the movement of inner gimbal sector gear 40. A machined surface on the front of the outer gimbal structure 36 provides a mounting position for securing the elevation servo valve 43 by fastening means through holes 44 for providing close cooperation with structure 36. Hydraulic ports 46 are provided for suitable mating with manifolding, not shown, in the outer gimbal structure 36. The hydraulic manifolding is further extended through the toroidal sector 30. Sealing of the hydraulic elements having manifolding is accomplished by appropriate techniques known in the hydraulic arts. Hydraulic end joints 17 are fastened, not shown, into the outer surface of toroidal sector 30. Thus, a hydraulic fluid path exists from the base 11 to the elevation servo valve 43 and its associated motor 42 to provide driving energy for causing motor 42 to operate.

Secured to toroidal sector 33 are electric harness connectors 35, and elevation stop means 47. The stop means 47 one on toroidal sector 33 and one on toroidal sector 30, not shown, are used for controlling the angular amount of movement about the elevation axis.

Waveguide assembly 100 extends through base 11, saddle 23, and the outer gimbal system and is held in rotary position with respect to the gimballing system by lower balance cap 91. This structure is more fully explained in a subsequent portion of this description.

The upper balance cap 60 has a machined section which mates with the elevation servo valve 43 and the outer gimbal structure 36; the balance cap 60 being fastened to the outer gimbal structure 36 with appropriate bolts, not shown, through bolt holes 62. Balance cap 60 also has an annular machined section that provides a housing for containing needle bearings 61 which mate with the collar 45 on inner gimbal sector gear 40 in order to provide substantially frictionless rotary motion about the elevation axis.

The inner gimbal structure 70 has secured to its top surface the inner gimbal gear 40 so as to allow movement of the inner gimbal structure both in the azimuth plane and the elevation plane. Machined in the inner gimbal structure 70 are various housings 79, 80, 81 and 82. These housings are shaped to receive azimuth rate gyro 77, inner gimbal waveguide assembly 106, reference alternator 72, and spin motor 73, respectively. Elevation rate gyro 83 is positioned in a cut-out section of inner gimbal structure 70. The accelerometer 71 is fitted by means of brackets 74 and fastened by means of bolts, not shown, through holes 75 to the inner gimbal structure 70 and is positioned so that it is over the azimuth rate gyro 77. Machined on inner gimbal 70 on either side at 68 are block stops which mate with the stops 47 and restrict the movement of the inner gimbal sector gear 40 in the elevation direction.

Figure 4:
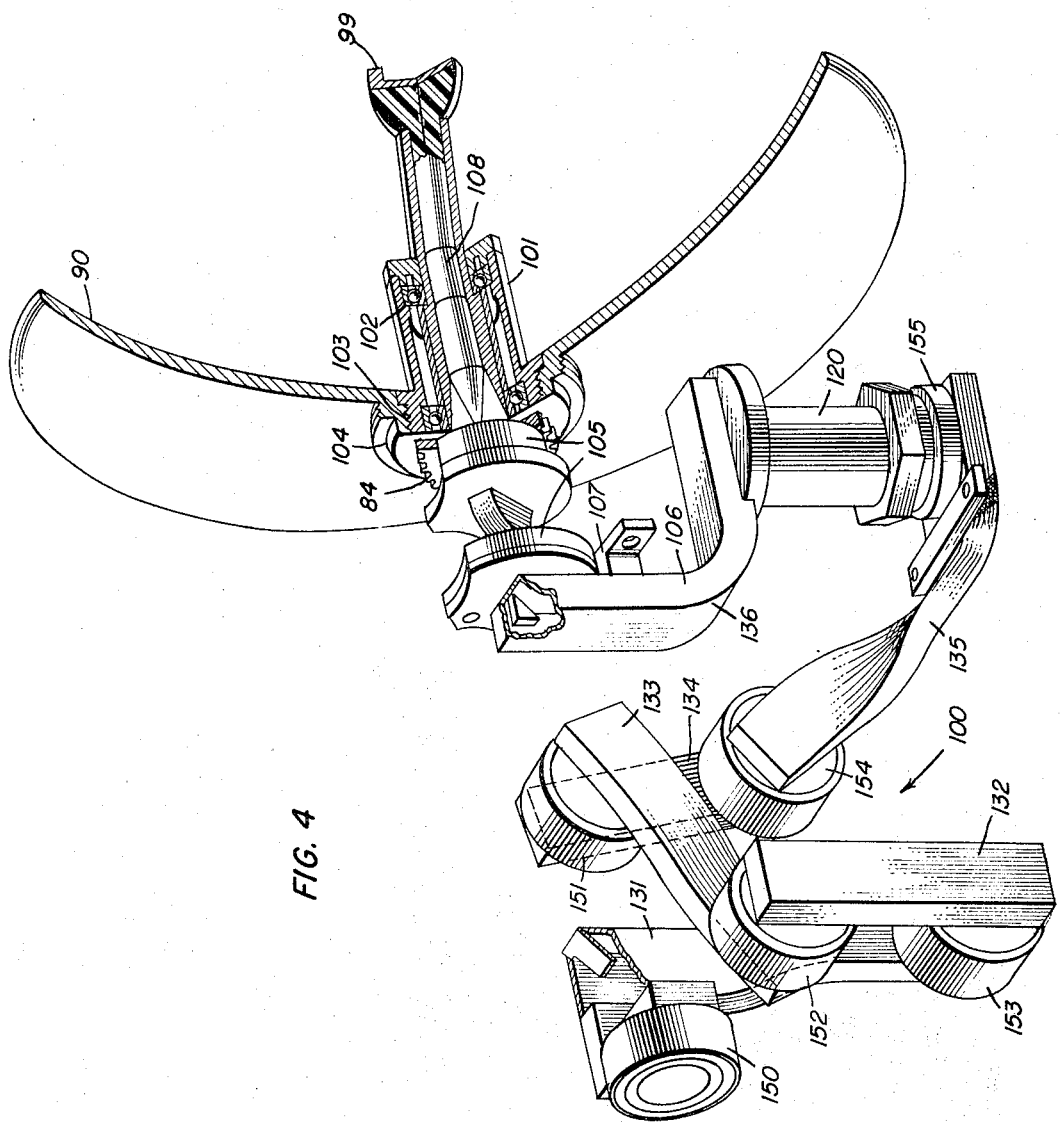
FIG. 4 is a view of the antenna microwave linkage, the parabolic reflector and associated parts of the R.F. feed section.

The parabolic reflector 90 is secured to the inner gimbal structure 70 and has R.F. feed assembly 101, best shown in FIG. 4, fastened by means of threads 103 to the reinforced portion 104 on the reflector 90. The gear 84 meshes with spin gear 76 which is driven by spin motor 73. The reference alternator 72 is driven by means, not shown, in accordance with the rotation of the spin motor 73.

Referring to FIG. 4 which best shows the breakdown of the elements in the R.F. feed assembly housing 101, the antenna is of the nutation type and provides nutating of the R.F. energy by rotating the off-set feed by means of spin motor 76 and associated gear 84. In the R.F. feed housing 101 are bearings 102 which function to provide substantially frictionless rotation of the R.F. feed assembly 99 about its longitudinal axis.

Referring now to FIG. 2, the lower balance cap 91 is fastened to the lower part of the outer gimbal structure 36 by means of bolts, not shown, extending through holes 92. The lower balance cap 91 is machined to a circular configuration in its interior to provide a housing for the inner gimbal bearing assembly 120. This bearing assembly 120 is positioned over a section of the inner waveguide assembly 106. Assembled around the inner waveguide assembly 106 are thrust bearings 123 which are positioned between washers 122. Mounted next to washer 122 is a bearing 125. Below bearing 125 is another thrust bearing 123 which is positioned between washers 122. This assembly provides a support for the waveguide and also provides a substantially frictionless bearing for the inner waveguide assembly 106 in the elevation. A cap bolt 121 is fastened to the inner waveguide assembly 106 by means of threaded portion 126. Thus, with balance cap 91 in position, provision is made for rotary movement of the waveguide assembly about the elevation axis and with a minimum amount of bearing friction.

Referring to FIG. 4 there is a showing of the antenna microwave linkage rotary couplers 150, 151, 152, 153, 154 and 155. These couplers allow movement of the parabolic reflector 90 and the R.F. feed 99 in both the elevation and the azimuth directions. The entire waveguide assembly extends from joint 150 through the base 11, through a machined section in the saddle 23. It is positioned between outer gimbals 30 and held in rotary position by means of balanced cap 91 and outer gimbal structure 36. The inner waveguide assembly 106 has matching transformers 105 extending through a machined housing 80 in inner gimbal structure 70. A suitable bracket 107 is used to rigidly secure waveguide 106 to the inner gimbal structure 70. The matching transformer 105 is fastened or secured by appropriate means known in the art to the parabolic side of the R.F. feed waveguide 108 which terminates in R.F. feed 99.

The rotary couplings which allow movement of the antenna in the azimuth direction are allowed by the four floating rotary joints 150, 151, 152 and 154 which connect sections of rectangular waveguide 131, 132, 133, 134, 135 and 136. These rotary joints provide for movement of the apparatus in the azimuth direction within the limits of movement allowed by the outer gimbal system.

Reference is now directed to FIG. 7 which shows a more detailed section of one of the waveguide rotary choke couplings 151, 152, 153 and 154. Secured by appropriate means to a section of rectangular waveguide 163 is a circular male conduit element 164 of generally circular cross-section. This male conduit element 164 is provided with threads on its outer periphery for mating engagement with internal threads on circular choke section 165. Choke section 165 has a machined section forming a shoulder or collar 160 along its outer periphery. Fitted over the choke section 165 on its outer periphery is a bearing member, for example, a Teflon ring 166. A Teflon washer 162 is positioned between the front of the choke section collar 160 and the sleeve 161 in order to provide a bearing surface between these two elements. A male connection element 169 is secured to one end of another rectangular waveguide 170. A circular sleeve 161 that has an internal shoulder 173 abutting Teflon washer 162 also has an internal shoulder 172 machined on its inner surface in order to maintain a desired spacing 167 between the choke insert section 165 and the male connection element 169. The sleeve section 161 is internally threaded. Bearing surfaces are provided on male connection element 169 and sleeve 161 at 172. Also, the Teflon washer 162 provides functions as a thrust bearing and sealing means for the rotary choke assembly sleeve 161 which fastens the waveguide sections 163 and 170 together. A spacing 171 is positively maintained between the two wave guides by the cooperating members at 172, thus allowing a substantially air tight and a substantially frictionless wave guide rotary joint.

The hydraulic rotary joints 200 are best shown in FIG. 5. Hydraulic tubular linkages 15 are secured to either end of rotary joint 200. Male connector element 201 is of generally cylindrical shape and is machined as shown to provide a plurality of stepped shoulders at 207 and 208, respectively. O-ring 210 is disposed in sealing engagement with shoulder 207. Secured on another hydraulic linkage member 15 is a generally cylindrical shaped sleeve connection 206. The generally cylindrical sleeve connector 206 has one end of hydraulic conduit linkage 15 secured therein in a suitable fashion as by welding, brazing or press fitting. A bearing ring 204 has a peripheral bearing surface at shoulder 202 so that cylindrical sleeve connector 206 has an inner surface in bearing contact with shoulder 203. The bearing ring 204 is held operatively engaged with sleeve connection 206 by snap ring 203 which is retained in the undercut at 205. The O-rings 210 are provided at the inner surface of the male connection 201 and at the inner end of the bearing ring 204 to provide a fluid tight coupling. The O-rings 210 may be of rubber or Teflon or any other suitable sealing material. Hydraulic fluid entering through conduit 15 can pass through passageways 209 and ports 213 in male connector 201, into chamber 212 formed by packing O-rings 210, and into sleeve conduit 15. The male connector 201 at 211 may be sealed by using a plug or other type of suitable seal. This hydraulic assembly 200 forms a fluid type quick disconnect swivel joint which allows freedom of movement through 360° in the plane of rotation and forms a high pressure fluid sealing.

FIG. 6 shows a typical antenna wiring diagram that is used in conjunction with a hydraulic tracking antenna. All the wiring terminates in electric terminal strip 12 positioned in base 11. Wiring harnesses carry the necessary leads to the appropriate locations on the antenna structure. Spin motor 73, reference alternator 72, accelerometer 71, azimuth rate gyro 77, elevation rate gyro 83, elevation potentiometer 41, elevation valve 43, azimuth potentiometer 19, and azimuth valve 14 are all connected by electrical leads to terminal 212 which in turn is fastened to terminal strip 12 in base 11.

In operation, as the antenna system is commanded to scan over its azimuth and elevation ranges from internal command signals originating in the missile guidance system internal to the missile, the assembly of the parabolic reflector 90 and its associated R.F. feed assembly 101 are moved in accordance with movement of the azimuth gimbal system and the elevation gimbal system.

Control of the azimuth gimbal system is obtained by electrical commands via electrical leads (see FIG. 6) to terminal strip 12 mounted on base 11. Electrical connections, not shown, from terminal strip 12 are connected to the outer gimbal servo valve 14 and upon energization of the servo valve 14, hydraulic fluid is delivered via hydraulic connection assembly 13, through manifolding in base 11, through motor housing 27, and into outer gimbal hydraulic motor 22. Motor 22 drives a gear 29 which meshes with the outer gimbal sector gear 31 on toroidal sector 33. The outer gimbal servo valve 14 allows hydraulic fluid under pressure to be delivered to the outer gimbal hydraulic motor 22 for gimbal system rotation in either a clockwise or a counter-clockwise direction. Thus, allowing any increment of angular movement of the azimuth gimbal system above and below the longitudinal axis of the missile. Limit stops 47 are provided at the outer extremities of the toroidal sectors 30 and 33, respectively, to restrict azimuth angular movement to plus or minus 70 degrees above or below the longitudinal axis of the missile.

In order to obtain an indication of the azimuth position, a readout means is provided by the inner gimbal potentiometer 41 which is geared and driven by the inner gimbal sector gear 40, for providing an electrical signal which is proportional to the angular position of the antenna apparatus from the longitudinal axis of the missile. Electrical leads (FIG. 6) from the outer gimbal potentiometer are connected via terminal strip 12 to an external indicating device, not shown, to give an indication of the amount of azimuth movement.

In order to provide a substantially rigid and frictionless connection to the base 11, the outer gimbal system is suspended from the base 11 by saddle 23. Saddle 23 has positioned on either side thereof ball-bearing suspension tubes 24 and ball-bearing recirculating tubes 26. In these respective tubes are steel ball-bearings 25 which provide the rotary suspension media for the outer gimballing system. As the toroidal sectors 30 and 33 of the outer gimbal system are driven by outer gimbal motor 22, they ride on rotating ball-bearings 25 which roll in the ball-bearing races 18 and ball-bearing suspension tubes 24. Assuming for purposes of illustration that the outer azimuth gimbal system is rotating away from the longitudinal axis of the missile, then ball-bearings 25 will follow the movement until they reach to top extremities of the recirculating tubes 26. The ball-bearings 25 then enter the recirculating tubes 26 to return to the ball-bearing suspension tubes 24 at the lower extremity of the recirculating tubes 26. Therefore, it can be seen that this structure provides a continuous band of rotating ball-bearings 25 and that this sort of support means provides a rigid and rugged structure. With an azimuth structure such as shown and described, large antenna "look" angles are possible since relatively large masses are capable of being suspended from the outer extremities of the toroidal sectors 30 and 33 without having twisting, jamming or failure of the outer azimuth gimbal system.

The elevation control system operates in substantially the same manner as the aforedescribed azimuth system. The hydraulic fluid for energization and actuation of the drive to the inner gimbal hydraulic motor 42 is obtained via an elevation servo valve 43 which is electrically operated via electrical leads (see FIG. 6) extending to terminal strip 12 in base 11. Appropriate electrical control signals to the elevation servo valve 43 causes hydraulic fluid to be delivered to the inner gimbal hydraulic motor 42 to cause rotation in either the clockwise or the counter-clockwise directions and normal to the direction of rotation of the azimuth gimbal system. Hydraulic fluid is coupled to the inner gimbal hydraulic motor 42 via hydraulic connection assemblies 13 in base 11, through hydraulic coupling plates 16, hydraulic linkages 15 and end assemblies 17. The end assemblies 17 are coupled to toroidal sector 30. Manifolding for the hydraulic fluid includes passageways which extend through toroidal sector 30, through outer gimbal structure 36 and hydraulic ports 46 to elevation servo valve 43. Additional ports deliver hydraulic fluid from the servo valve 43 to the inner gimbal hydraulic motor 42. None of the manifolding arrangements have been shown on the drawings since manifolding techniques are well-known in the hydraulic arts. The gear 46 on the inner gimbal hydraulic motor 42 meshes with the gearing on inner gimbal sector gear 40 to cause rotation of the antenna apparatus about the elevation axis in an arc defined by stops 47. These stops 47 are provided on toroidal sectors 30 and 33, respectively, to limit the movement of the antenna apparatus about the elevation axis. A readout means for indicating the angular position of the elevation of the antenna apparatus from the missile longitudinal axis is provided by inner gimbal potentiometer 41. This potentiometer 41 is coupled by appropriate electrical leads to the terminal strip 12 in base 11.

The inner gimbal sector gear pivots on bearings 61 in balance cap 60. Thus, allowing the inner gimbal sector gear 40 to move freely about the azimuth axis as the outer gimbal system moves, yet allowing freedom of movement of the inner gimbal sector gear 40 about the elevation axis. The R.F. assembly 101, parabolic reflector assembly 90 and inner gimbal structure 70 are mounted onto the bottom of the inner gimbal sector gear 40 to move in conjunction with the inner gimbal sector gear 40.

The antenna system is also provided with a spin motor 73 to provide nutation of the R.F. feed assembly 101 by rotating it around the longitudinal axis. A reference alternator 72 is geared to the R.F. feed assembly 101 to provide reference signals correlative to the instantaneous position of the R.F. feed assembly 101 as it rotates about its longitudinal axis. An accelerometer 71 also mounted on inner gimbal structure 70 is oriented to sense missile acceleration along the longitudinal axis. Two subminiature rate gyros, azimuth rate gyro 77, and elevation rate gyro 83, are coupled to the inner gimbal structure 70. These rate gyros have their respective axes parallel to the pitch and yaw axis of the antenna for providing rate signals correlative to antenna movement. All of the above sensing elements, rate gyros 77 and 83, accelerometer 71, and reference alternator 72 are coupled via electrical wiring to the terminal strip 12 in base 11. The driving voltage for spin motor 73 is obtained via electrical leads from terminal strip 12.

Microwave linkage connection for the R.F. antenna feed 101 is coupled from the base 11 through toroidal sectors 30 and 33, respectively, through inner gimbal structure 70 to R.F. feed assembly 101. Microwave energy is conducted through the microwave linkage to the R.F. feed assembly 101. Movement of this microwave assembly about the elevation and the azimuth axis is provided by four floating rotary joints 151, 152, 153 and 154, and movement about the elevation axis is provided for by the inner gimbal gearing assembly 120. Radiant energy received or transmitted is conducted through the rectangular microwave sections and rotary choke joints to the base 11.

Microwave linkage connection for the R.F. antenna feed 101 is coupled from the base 11 through toroidal sectors 30 and 33, respectively, through inner gimbal structure 70 to R.F. feed assembly 101. Microwave energy is conducted through the microwave linkage to the R.F. feed assembly 101. Movement of this microwave assembly about the elevation and the azimuth axis is accomplished by virtue of the four floating rotary joints 151, 152, 153 and 154, and movement about the elevation axis is accomplished by the virtue of the inner gimbal bearing assembly 120. Radiant energy received or transmitted is thus conducted through the rectangular microwave sections and rotary choke joints to the base 11.

With reference to FIG. 7 operation of the microwave choke swivel joints provide for substantially frictionless rotation about the longitudinal axis of the joint. The Teflon ring 166 positioned in the quarter-wave cavity of the choke section 165 allows free movement of the sleeve 161 because of the bearing action of the Teflon ring 166 and the inner surface of the sleeve 161. An efficient bearing surface also exists due to the Teflon washer 162 that is positioned between the shoulder 173 of sleeve 161 and shoulder 160 of choke section 165. Radio frequency energy traveling through rectangular waveguide 163 is efficiently coupled to waveguide 170 by means of the rotary swivel joint.

Hydraulic rotary joints 200, best shown in FIG. 5, permit free rotation of the hydraulic linkages 15 as the antenna oscillates about the azimuth and elevation axes. The hydraulic rotary joints are constructed in such a manner that the sleeve member 206 rides on positive bearing surfaces 207 and 202 machined on the male connection member 201 and the bearing ring 204. The sealing O-rings 210 are slightly compressed by the inner surface of the sleeve 206 for providing an efficient sealing means. Hydraulic fluid entering through member 15 travels through passageway 209, through ports 213 and into chamber 212. The chamber 212 is provided with sealing O-rings 210 to prevent fluid leakage from the joint. Hydraulic fluid from chamber 212 enters sleeve 206 which is connected to hydraulic member 15. The hydraulic joint disclosed provides a quick disconnect connector for coupling and uncoupling the antenna to the missile guidance unit, not shown. Also, the instant novel hydraulic connector tends to minimize or obviate air entrapment in the hydraulic linkages 15 during assembly and disassembly.

Obviously many modifications and variations of the present invention are possible in the light of the above teachings. It is therefore to be understood that within the scope of the appended claims the invention may be practiced otherwise than as specifically described.

What is claimed is:

1. A two axis tracking antenna system for use in guidance of a pilotless missile for receiving or directing radiant energy for target location for providing homing information to said missile comprising:

a base for supporting the antenna system in spaced relationship with the missile air frame;

a centrally positioned rigid saddle member secured to said base;
a gimballing means movable about two axes;
ball-bearing suspension tubes and ball-bearing recirculating tubes secured to said saddle member and said gimballing means;
ball-bearings positioned in said ball-bearing suspension tubes and ball-bearing recirculating tubes;
said gimballing means operatively mounted to said ball-bearings; and
a radiant energy reflecting means operatively coupled to said gimballing means;
whereby the radiant reflecting means moves in response to the gimballing system as the gimballing system moves on said ball-bearings in the ball-bearing suspension tubes thereby providing the ball-bearings to recirculate through the recirculating tubes for allowing substantially frictionless movement of the radiant energy reflecting means over a wide scanning area.

2. A two axis tracking antenna apparatus for use in guidance of a pilotless missile for receiving or directing radiant energy for target location for providing homing information to said missile comprising:
a base for supporting the said antenna apparatus in spaced relationship with a missile air frame;
a saddle positioned substantially in the center of said base for providing a substantially rigid mounting for recirculating ball-bearing means positioned on either side of said saddle;
said circulating ball-bearing means housing ball-bearings for providing a point contact between adjacent ball-bearings;
an azimuth gimbal means operatively attached to said ball-bearings by mating with ball-bearings races on said azimuth gimbal;
said azimuth gimbal having ball-bearing races positioned on its inner side and around its outer periphery;
first gearing means positioned on the arc of said azimuth gimbal;
an inner gimbal pivotally attached to said outter gimbal and operatively connected for movement in a direction normal to the movement of the azimuth gimbal;
second gearing means positioned on the outer periphery of said inner gimbal;
said first gearing means operatively coupled with an outer gimbal motor for providing controlled driving movement about the azimuth axis;
a second driving means operatively coupled to said second gearing means for providing controlled movements about the elevation axis; and
a radiant energy reflecting means operatively attached to said inner gimbal for moving about the elevation and azimuth axes.

3. A two axis tracking antenna system for receiving or directing radiant energy for providing detection and tracking information about targets to a pilotless missile guidance system comprising:
a base of generally circular configuration for supporting said antenna system in spaced relationship with a missile air frame;
a saddle secured to said base and positioned substantially in the center of said base;
recirculating ball-bearing tubes and ball-bearing suspension means positioned on either side of said saddle and positioned in spaced relationship to one another;
arc sectors provided with ball-bearing races on their inner surface and said arc sectors positioned on either side of said saddle;
said ball-bearing suspension means and ball-bearing races of said arc sectors being opposite one another;
a plurality of ball-bearings positioned between said ball-bearing and ball-bearing races of said arc sectors for providing substantially frictionless rotary action between said arc sectors and said ball-bearing suspension means;
a parabolic reflector and R.F. feed assembly mounted on said inner gimbal structure;
a first driving means secured to said base and operatively coupled with said arc sectors for providing movement of said arc sectors about an azimuth axis;
electrical readout means secured to said base and operatively coupled to said first driving means for providing electrical indications proportional to the amount of movement about the azimuth axis;
an outer gimbal structure for securing the arc sectors in spaced relationship with one another;
said outer gimbal provided with a first and second recessed housing;
an inner gimbal sector gear mounted to said outer gimbal structure by bearing means for allowing said gimbal sector gear to move normal to the rotation of said arc sectors;
an inner gimbal structure rigidly secured to one face of said inner gimbal sector gear;
a second driving means secured in said first recessed housing and operatively coupled for driving said inner gimbal sector gear about an elevation axis;
electrical readout means secured in said second recessed housing and operatively coupled to said second driving means for providing electrical indications proportional to the amount of movement about the elevation axis; and
radiant energy transporting means positioned through said arc sectors and said inner gimbal structure for conducting radiant energy to said R.F. feed assembly;
whereby the R.F. feed assembly received and radiates energy about the azimuth and elevation axis.

4. In a two axis tracking antenna apparatus for receiving or directing radiant energy wherein:
a radiant energy reflecting means is coupled to a system for providing movement of said radiant energy reflecting means;
the combination with said radiant energy reflecting means of a movable support operatively coupled for rotation and limited axial movement relative to each other comprising:
a support member;
ball-bearing suspension tubes and ball-bearing recirculating tubes mounted on opposite sides of said support member in spaced relationship to one another;
said ball-bearing suspension tubes provided with integral ball-bearing races;
two spaced arc sectors supporting said radiant energy reflecting means and for providing reflecting means angular rotation about an azimuth axis;
said arc sectors each provided with ball-bearing races on their outer peripheries; and
a plurality of ball-bearings positioned in said ball-bearing suspension tubes;
whereby the saddle member is secured between the two arc sectors by the plurality of ball-bearings cooperating with the ball-bearing races in the arc sectors and the ball-bearing races in the ball-bearing suspension tubes thereby providing a rotatable structure that has high stiffness and strength and minimum friction as the radiant energy reflecting means moves about the azimuth axis.

5. A tracking antenna system for use with a guidance system for a pilotless missile that homes on targets comprising:
a base for supporting an antenna system in spaced relationship with a missile air frame;
a gimballing system for providing movement about two axes;
a centrally positioned rigid member secured to said base for providing rotatable mounting for said gimballing system;

radiant energy reflecting means operatively connected to said gimballing systems for allowing movement thereof;

hydraulic driving means for providing energy to move the gimballing system; and rotary hydraulic fluid transporting means fastened to said base and said hydraulic driving means for supplying energy to the driving means;

whereby the radiant energy reflecting means moves in response to the energy supplied through the rotary hydraulic fluid transporting means for providing movement of the gimballing system thereby allowing antenna tracking of targets over a substantially large look angle.

6. In hydraulic tracking antenna apparatus wherein: hydraulic lines conduct hydraulic driving fluid to the said antenna apparatus, a rotary sealing arrangement for said hydraulic lines comprising:

a first fluid coupling means with an integrally formed collar for providing a first peripheral bearing surface;

a holding means with an integrally formed collar for providing a second peripheral bearing surface;

bearing surfaces on an inner circumference of a fluid coupling sleeve means for cooperating with said first and said second bearing surfaces for providing substantially frictionless surfaces;

a sealing means in spaced relationship with said first peripheral bearing surface and said second peripheral bearing surface;

a securing means for securing said holding means in abutting cooperation with said fluid coupling sleeve;

whereby the fluid coupling sleeve rotates freely with respect to the first fluid coupling means and the sealing means provides a leakage proof path for the transmission of fluid from the first fluid coupling means to the fluid coupling sleeve.

7. In a hydraulic tracking antenna apparatus wherein:

a radiant energy reflecting means is driven by hydraulic means about elevation and azimuth axes;

the combination with said radiant energy reflecting means of a hydraulic swivel joint in which male end sleeve members are operatively coupled for rotation and limited axial movement in relation to each other;

a first bearing surface integral with said male member;

a second bearing surface encircling said male member and spaced from said first bearing surface;

said second bearing surface integrally coupled to a flange;

an annular sleeve member operatively mounted with the inner circumference co-operating with said first and said second bearing surfaces;

said flange abutting an outer edge of said sleeve for providing a spaced fluid chamber;

flexible O-ring sealing members positioned on the inside of said spaced chamber for providing a leakproof seal; and a snap ring abutting said flange at an outer edge for maintaining the annular sleeve, the mate member and the flange in close engagement with one another;

whereby the annular sleeve rotates freely about the male member on positive bearing surfaces for providing a fluid swivel joint that may be easily and rapidly disassembled and reassembled.

8. In a tracking antenna system for use with a guidance system for a pilotless missile that homes on a target wherein:

a two axis gimballing system is driven by a hydraulic driving means for moving a radiant energy reflecting means about elevation and azimuth axes;

the combination with said gimballing system of a hydraulic swivel joint in which male and sleeve members are operatively coupled for rotation and limitation axial movement with respect to one another;

said male member having a protruding section with a step portion at an inner end for providing a peripheral bearing surface;

an annular bearing ring formed with a projecting portion defining a shoulder;

said bearing ring interfit with said protruding member so that the inner periphery of the annular portion mates with the outer periphery of said protruding member;

a fluid passageway through said male member terminating in outlet ports in said protruding member;

flexible O-ring sealing members encircling said protruding member and spaced on either side of said outlet ports;

an annular sleeve of generally circular cross-sectional area having bearing surfaces on the inner circumference and outer edges for providing substantially frictionless mating with said step and said bearing ring;

a fluid passageway through said annular sleeve;

a fluid chamber communicating with said fluid passageway in said male member and said fluid passageway in said sleeve, said chamber defined by said O-rings and said sleeve for containing a fluid under pressure; and a snap ring abutting said bearing ring and interfitted in an annular slot in said protruding member for securing the annular sleeve, the male member and the bearing ring in close engagement with one another;

whereby the annular sleeve rotates freely about the male protruding section on positive bearing surfaces and the annular sleeve and O-rings forms a fluid pressure seal for providing a leakageproof path for fluid passing through the male member into the annular sleeve.

9. In a tracking antenna system for use with a guidance system for a pilotless missile that homes on a target wherein:

a two axis gimballing system is driven by a hydraulic driving means for moving a radiant energy reflecting means about elevation and azimuth axes;

the combination with said gimballing system of a hydraulic swivel joint in which male and sleeve members are operatively coupled for rotation and limitation axial movement with respect to one another;

said male member having a protruding section with a step portion at an inner end for providing a periperal bearing surface;

a bearing ring formed with a projecting portion to define a shoulder and positioned so as to encircle said protruding member at its outer end;

fluid passage ports in said protruding member in spaced relationship with said inner shoulder and said bearing ring;

O-ring sealing members encircling said protruding member and spaced to about said inner step and said shoulder of said bearing ring;

said O-ring sealing members outer circumference extending a substantial distance above the peripheral edge of said bearing surface of said step portion and the bearing surface of said bearing ring;

an annular sleeve member with a fluid passage therethrough;

said annular sleeve having bearing surfaces on the inner circumference for providing a substantially frictionless mating with said step and said bearing ring; and a fastening means for holding the said annular sleeve member on said protruding member;

whereby the annular sleeve rotates freely about the male protruding section on positive bearing surfaces and the inner circumference of said annular sleeve applies radial pressure to the outer periphery of said O-rings for forming a fluid pressure seal to prevent leakage of fluid passing through the parts in the male member into the fluid passageway of the annular sleeve.

10. In a tracking antenna apparatus wherein:
a radiant energy reflecting means is driven by hydraulic driving means for movement of the radiant energy reflecting means about two axes;
the combination with said antenna apparatus of a hydraulic swivel joint in which a male fluid coupling and a female fluid coupling member is operatively coupled for rotation and limitation axial movement with respect to one another;
said male fluid coupling member having a protruding section with a first collar integrally formed with said male protruding section at the inner end thereof for providing a first peripheral bearing surface;
an annular bearing ring with an integrally formed second collar for providing a second peripheral bearing surface;
a female member of generally circular cross-sectional area having a bearing surface on the inner circumference for co-operating with said first and second peripheral bearing surfaces for providing substantially frictionless rotary movement between said male and female members;
O-ring sealing members encircling said protruding member and spaced to abut an edge of said first and said second collars;
a fluid chamber formed by said O-rings, said male member and said female member;
a first fluid passageway through said male member;
ports in said protruding member communicating with said first fluid passageway;
a second fluid passageway extending through the female member;
a snap ring abutting said bearing ring and interfitted in an annular slot in said protruding member for securing the annular sleeve, the male member and the bearing ring in close engagement with one another;
whereby the female member rotates freely about the male protruding section on positive bearing surfaces and the inner circumference of said female member and O-rings form a fluid pressure seal for providing a leakage proof path for fluid passing through the male member into the female member.

11. In a two axis tracking antenna apparatus for receiving or directing radiant energy wherein:
a radiant energy reflecting means is coupled to a waveguide for providing conduction of microwave energy to the said radiant energy reflecting means;
the combination with radiant energy reflecting means of a microwave swivel joint in which waveguide coupling members are operatively coupled for rotation and limited axial movement relative to one another;
a first circular coupling member coupled to a first waveguide section;
an annular insert member encircling said first circular member;
a second circular coupling member coupled to a second waveguide section;
a sleeve member with a shoulder on the inner periphery for forming a bearing surface;
said sleeve member securing said first and said second coupling member together in co-operating relationship for providing substantially frictionless rotary movement;
whereby the swivel joint rotates freely on positive bearing surfaces.

12. In a tracking antenna apparatus for use with a guidance system for a pilotless missile that homes on a target wherein:
a two axis gimballing system moves a radiant energy reflecting means about elevation and azimuth axes;
the combination with said tracking antenna of a microwave rotary joint that operatively couples two rectangular wave sections with respect to one another;
a first circular coupling with threads on an outer periphery;
a second circular coupling with threads on an outer periphery;
a choke section secured to said first circular coupling for providing said first circular coupling and said second circular coupling to be electrically joined;
a sleeve with first and second shoulders on the inner periphery, the inner periphery having threads above said first shoulder;
said sleeve securing said choke section and said second circular coupling in spaced relationship with one another; and
a bearing washer abutting a surface of said choke and said sleeve and positioned to encircle said first coupling;
whereby the sleeve secures the choke section and second coupling in spaced relationship and the bearing washer provides substantially frictionless rotary movement of the swivel joint thereby providing a microwave swivel joint with low power losses.

13. In a two axis tracking antenna apparatus for receiving or directing radiant energy wherein:
a radiant energy reflecting means is coupled to a waveguide for providing conduction of microwave energy to the said radiant energy reflecting means;
the combination with said radiant energy reflecting means of a microwave swivel joint in which waveguide coupling members are operatively coupled for rotation and limited axial movement relative to one another comprising:
a first circular coupling threaded on an outer periphery;
a second circular coupling threaded on an outer periphery;
a metallic cylinder threaded on an inner periphery and secured to the threaded portion of said first circular coupling;
a slot on said metallic cylinder around the outer periphery and adjacent to said first circular coupling;
a dielectric ring spacer substantially filling said slot of said metallic cylinder and interfitted in close co-operation of the walls of said slot;
a sleeve with first and second shoulders on an inner periphery;
said first shoulder of said sleeve abutting a portion of the face of said second circular coupling for securing said metallic cylinder section and said second circular coupling in spaced relationship with one another for providing radial gap between a surface of said second coupling and a surface of said metallic cylinder;
said slot of said metallic cylinder and an inner periphery of said sleeve forming a chamber dimension which is a quarter wavelength of the operating frequency of said tracking antenna and for providing an efficient electrical coupling between said first circular coupling and said second circular coupling;
a dielectric thrust bearing encircling said first circular coupling to abutting a face of said metallic cylinder and a face of said second shoulder;
whereby the sleeve secures the first circular coupling and the second circular coupling in spaced relationship on positive bearing surfaces and the dielectric thrust bearing abutting the metallic cylinder and the second shoulder provides substantially frictionless rotary movement of the swivel joint thereby providing a waveguide coupling that has low power loss.

14. The apparatus of claim 13 wherein the dielectric thrust bearing comprises a washer shaped rubber like material for providing a substantially frictionless surface and an air tight seal.

15. The apparatus of claim 14 wherein the second circular coupling and the shoulder of the sleeve comprises bearing surfaces at their contacting portions for providing substantially frictionless surfaces thereby admitting free rotation action of the joint.

References Cited

UNITED STATES PATENTS

| | | | |
|---|---|---|---|
| 2,672,379 | 3/1954 | McVey | 308—6 |
| 2,768,358 | 10/1956 | Moseley et al. | 333—98 |
| 2,872,217 | 2/1959 | May | 285—98 |
| 2,893,002 | 6/1959 | Ross | 343—765 |
| 2,901,208 | 8/1959 | Jones | 343—765 |
| 3,107,543 | 10/1963 | Kershner et al. | 343—765 |

ELI LIEBERMAN, *Primary Examiner.*

CHESTER L. JUSTUS, *Examiner.*

R. E. BERGER, *Assistant Examiner.*